(12) United States Patent
Xiao

(10) Patent No.: US 11,926,247 B2
(45) Date of Patent: Mar. 12, 2024

(54) ANTI-SKIPPING DEVICE, SEAT FOOTREST DEVICE AND CHILD SAFETY SEAT HAVING THE SAME

(71) Applicant: Wonderland Switzerland AG, Steinhausen (CH)

(72) Inventor: Xiaohong Xiao, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 118 days.

(21) Appl. No.: 17/743,465

(22) Filed: May 13, 2022

(65) Prior Publication Data

US 2022/0363169 A1 Nov. 17, 2022

(30) Foreign Application Priority Data

May 14, 2021 (CN) .......................... 202110528449.5

(51) Int. Cl.
*B60N 2/28* (2006.01)
*B60N 2/90* (2018.01)

(52) U.S. Cl.
CPC ........... *B60N 2/2827* (2013.01); *B60N 2/995* (2018.02)

(58) Field of Classification Search
CPC .............................. B60N 2/2827; B60N 2/995
USPC ..................................................... 297/250.1
See application file for complete search history.

(56) References Cited

U.S. PATENT DOCUMENTS

| 5,551,751 | A | * | 9/1996 | Sedlack | ............... | B60N 2/2875 |
| | | | | | | 297/216.19 |
| 6,183,044 | B1 | * | 2/2001 | Koyanagi | ............ | B60N 2/2887 |
| | | | | | | 297/256.16 |
| 8,366,192 | B2 | * | 2/2013 | Clement | ............. | B60N 2/2875 |
| | | | | | | 297/217.2 |
| 9,039,083 | B2 | * | 5/2015 | Clement | ............. | B60N 2/2884 |
| | | | | | | 297/256.13 |
| 10,052,982 | B1 | * | 8/2018 | Danley | ............... | B60N 2/2851 |
| 2007/0069562 | A1 | * | 3/2007 | Van Montfort | ...... | B60N 2/2824 |
| | | | | | | 297/253 |
| 2016/0200225 | A1 | | 7/2016 | Van Der Veer | | |

FOREIGN PATENT DOCUMENTS

| CN | 104553902 A | 4/2015 |
| CN | 106080304 A | 11/2016 |
| CN | 106671836 A | 5/2017 |

* cited by examiner

*Primary Examiner* — Mark R Wendell
(74) *Attorney, Agent, or Firm* — Winston Hsu

(57) ABSTRACT

An anti-skipping device including: a pair of fixed bases, symmetrically disposed on both sides, having slide rails extending along a longitudinal direction, and having two side walls facing each other along a transverse direction perpendicular to the longitudinal direction; an extension member, movably inserted on the fixed bases, and being slidable along the slide rail to move between an extended position and a retracted position in respect to the fixed bases; a locking member for coupling the fixed bases and the extension member, so as to lock a position of the extension member in respect to the fixed bases; and a crossbar, disposed on the two side walls to prevent the two side walls from being laterally displaced from each other.

20 Claims, 16 Drawing Sheets

ANTI-SKIPPING DEVICE, SEAT FOOTREST DEVICE AND CHILD SAFETY SEAT HAVING THE SAME

BACKGROUND OF THE DISCLOSURE

1. Field of the Disclosure

The present disclosure relates to an anti-skipping device, a seat footrest device and a child safety seat having the anti-skipping device.

2. Description of the Prior Art

A child safety seats is usually used in a car for protecting safety of a child when the car encounters an accidental collision. For some uses, a lower part of the child seat has a foot pedal for the child to place feet. The foot pedal may be extendable, i.e., may extend from or retract into the lower portion of the seat.

In such extendable foot pedal, a fixing device is needed for fixing the foot pedal in an extended or retracted position. It has been found that in some uses, the foot pedal may be, upon impact, divorced from restraint of the fixing device, thereby being accidentally escaped from the extended position (i.e., skipping). Therefore, it is necessary to provide an anti-skipping device which can prevent the above-mentioned skipping.

SUMMARY OF THE DISCLOSURE

According to the disclosure, an anti-skipping device is provided. The anti-skipping device includes: a pair of fixed bases, symmetrically disposed on both sides, having slide rails extending along a longitudinal direction, and having two side walls facing each other along a transverse direction perpendicular to the longitudinal direction; an extension member, movably inserted on the fixed bases, and being slidable along the slide rail to move between an extended position and a retracted position in respect to the fixed bases; a locking member for coupling the fixed bases and the extension member, so as to lock a position of the extension member in respect to the fixed bases; and a crossbar, disposed on the two side walls to prevent the two side walls from being laterally displaced from each other.

In an embodiment, both ends of the crossbar are respectively penetrated to outer sides of the two side walls, and are fastened to the two side walls by fixed stopper members on outer sides to prevent a lateral displacement of the two side walls away from each other.

In an embodiment, the crossbar is arranged at a position where one side of the extension member does not interfere with a moving route of the extension member.

In an embodiment, the anti-skipping device further includes: a casing, fixed to the extension member, located between the crossbar and the extension member; the fixed bases are provided with at least two sets of insertion slots respectively opposite surfaces of the two side walls; both sides of the casing are respectively provided with plug passing slots matched with the insertion slots; and when the insertion slots are aligned with the plug passing slots, the locking member is inserted into both the insertion slots and the plug passing slots, such that a position of the extension member is fixed in respect to the fixed bases.

In an embodiment, the locking member is located on a side of the extension member facing the crossbar, and has a handle and two symmetrically arranged arms, the two arms respectively extend from the handle toward the two side walls of the fixed bases, and ends of the two arms are respectively provided with plugs, and when the insertion slots are aligned with the plug passing slots, the plug is able to be inserted into both the insertion slots and the plug passing slots.

In an embodiment, the handle is located at a lateral middle position of the extension member, and the two arms are respectively arc-shaped components which are bent and extended in approximately a quarter-circle arc from the lateral middle position of the handle toward the two side walls.

In an embodiment, the arms are rigid arms; each of the insertion slots includes a longitudinal portion and a vertical portion, the longitudinal portion and the vertical portion are respectively substantially linear and intersect each other at an intersection point; each of the plugs have has a shape corresponding to the insertion slots, thus being able to be smoothly inserted into the insertion slots and forming shape fit with the insertion slots.

In an embodiment, one set of the at least two sets of insertion slots is corresponding to an extension position of the extension member, and the other set of the at least two sets of insertion slots is corresponding to a retracted position of the extension member.

In an embodiment, two slideways are formed in the casing, the two slideways extend toward the two side walls with approximately a quarter-circle arc, for accommodating the two arms, thereby defining motion trajectories of the two arms.

In an embodiment, in the extended or retracted position of the extension member, the arms of the locking member protrudes from the slideways and is inserted into the insertion slots and the plug passing slots; and under pulling of an external force, the arms of the locking member are able to be retracted into the slideways to be divorced from engagement with the insertion slots and the plug passing slots, such that the extension member is able to slide in respect to the fixed bases along a longitudinal direction.

In an embodiment, an elastic member is disposed between the locking member and the casing, and the elastic member applies a restoring force to the locking member, such that the two arms of the locking member remain in a state of protruding from the slideways.

In an embodiment, the crossbar is disposed at approximately a first third of a longitudinal length of the side walls; a diameter of the crossbar is approximately one tenth of a length of vertical edges of the side walls; and a length of a portion of the crossbar located between the two side walls is greater than a length of a portion of the crossbar inserted inside each of the side walls.

According to the disclosure, a seat footrest device is provided. The seat footrest device includes: a foot pedal; and the anti-skipping device according to the disclosure, wherein the foot pedal is wrapped on the extension member of the anti-skipping device.

In an embodiment, the handle of the locking member of the anti-skipping device is exposed on a side of the foot pedal facing the crossbar.

According to the disclosure, a child safety seat is provided. The child safety seat includes: a seat part; and the seat footrest device according to the disclosure; wherein the foot pedal of the seat footrest device and the anti-skipping device respectively located below the seat part, the fixed bases of the anti-skipping device is fixed to a bottom side of the seat part, the longitudinal direction is a front-rear direction of the seat part, and the transverse direction is a left-right direction of the seat part; when the extension member is in the extended position, the foot pedal protrudes from a bottom side of the seat part to a front of the seat part; when the extension member is in the retracted position, the foot pedal is at least partially located below the bottom side of the seat part; and when the extension member is in the retracted position, the foot pedal is at least partially located below the bottom side of the seat part; and the handle of the locking member of the anti-skipping device is exposed below the foot pedal.

BRIEF DESCRIPTION OF THE DRAWINGS

Embodiments of the present disclosure will be specifically described below in conjunction with the accompanying drawings, in which.

DETAILED DESCRIPTION

The disclosure will be described in detail below by referring to the accompanying drawings.

Although the disclosure is illustrated and described herein with reference to specific embodiments, the disclosure should not be limited to the shown details. Specifically, various modifications may be made in these details within the scope of equivalents of the claims and without departing from the disclosure.

The direction descriptions such as "front," "rear," "up," and "down" involved in the context are only for the convenience of understanding, and the disclosure is not limited to these directions, but can be adjusted according to actual situation.

Figure 1:
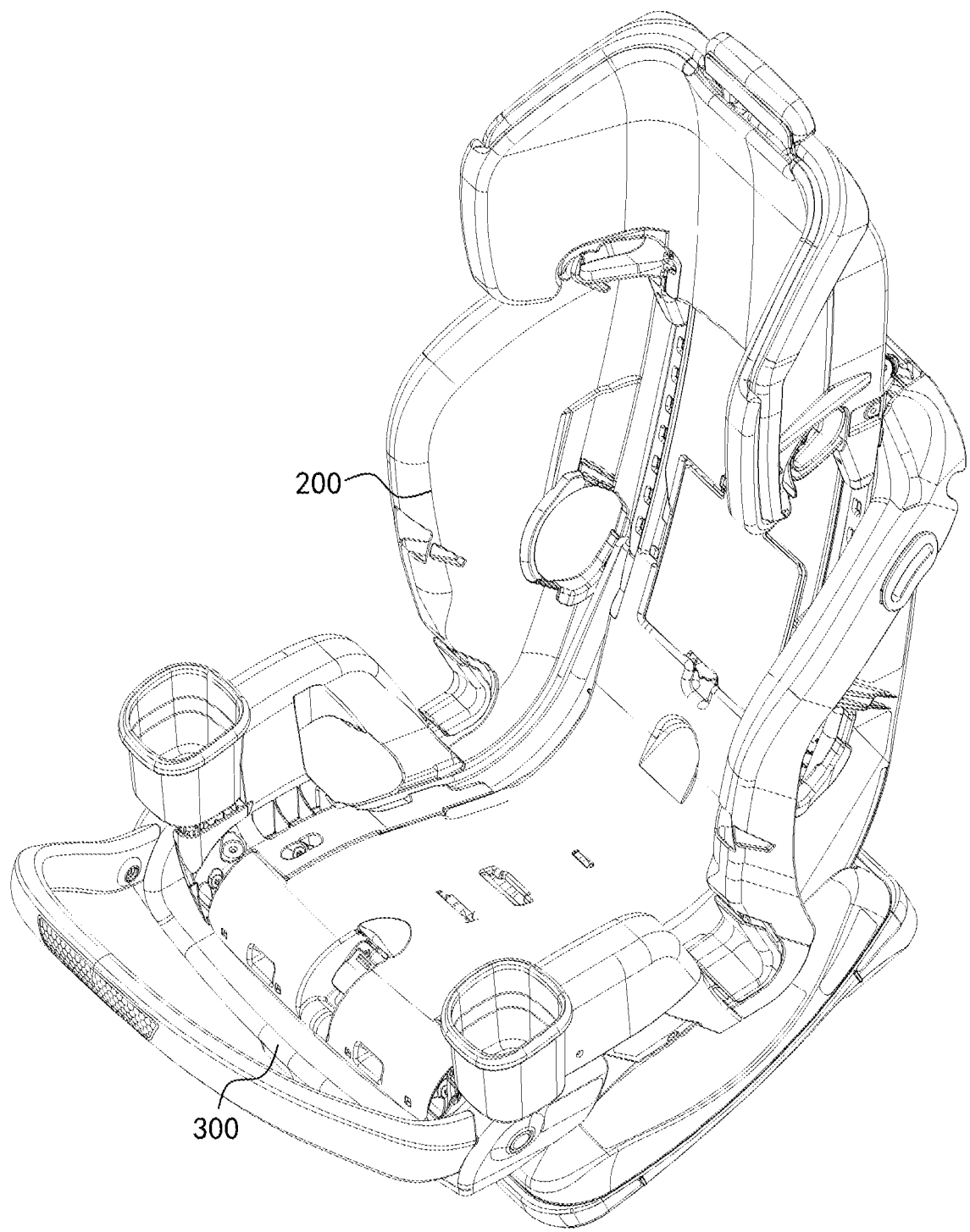
FIG. 1 is a perspective view of a child safety seat of according to the disclosure.
Figure 2:
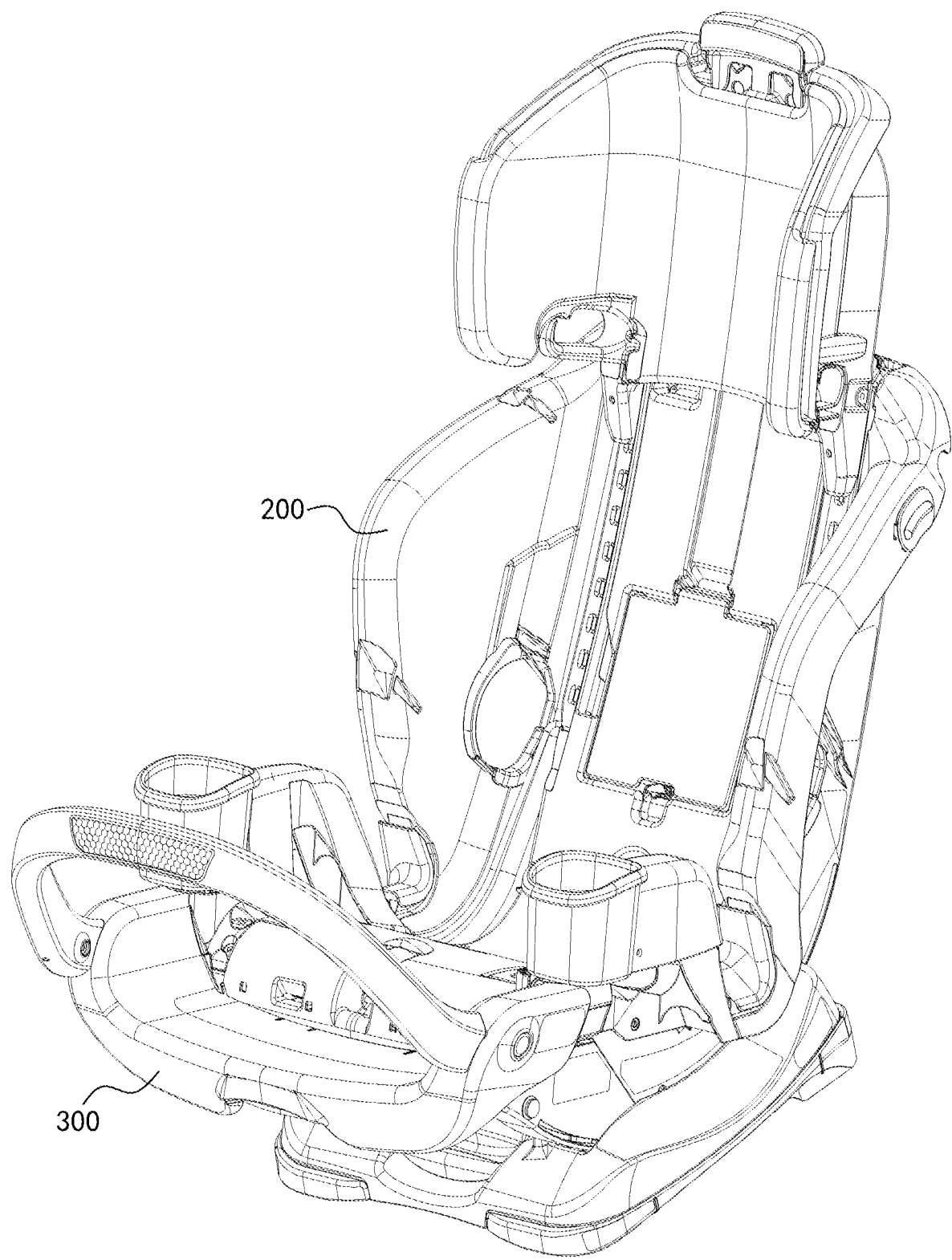
FIG. 2 is a perspective view of the child safety seat according to the disclosure from another angle.

Firstly referring to FIGS. 1 and 2, a child safety seat according to an embodiment of the disclosure is shown therein as a whole. As shown, the child safety seat includes a seat part 200 and a foot pedal 300, wherein the seat part 200 is a part that is fixed on a car for a child to sit; the foot pedal 300 is a part that can extend from below the seat part 200 to allow the child to place his feet. The device for connecting the foot pedal 300 to the seat part 200 is the anti-skipping device 100 of the disclosure. The anti-skipping device 100 is used to movably connect the foot pedal 300 to the seat part 200, and can lock the foot pedal 300 in a plurality of different positions in respect to the seat part 200. These positions may be, for example, an extended position and a retracted position along a front-rear direction of the seat part 200. For example, in FIG. 1, the foot pedal 300 is shown in the retracted position, and in FIG. 2, the foot pedal 300 is shown in the extended position.

In use, the foot pedal 300 may be subjected to collision due to bumping of the car. One of the functions of the anti-skipping device 100 of the disclosure is to prevent the foot pedal 300 from being accidentally departed from its locked position if subjected to a collision.

For ease of understanding, the front-rear direction of the seat is referred to as the longitudinal direction, the left-right direction is referred to as the lateral direction, and the up-down direction is referred to as the vertical direction hereinafter.

Figure 3A:
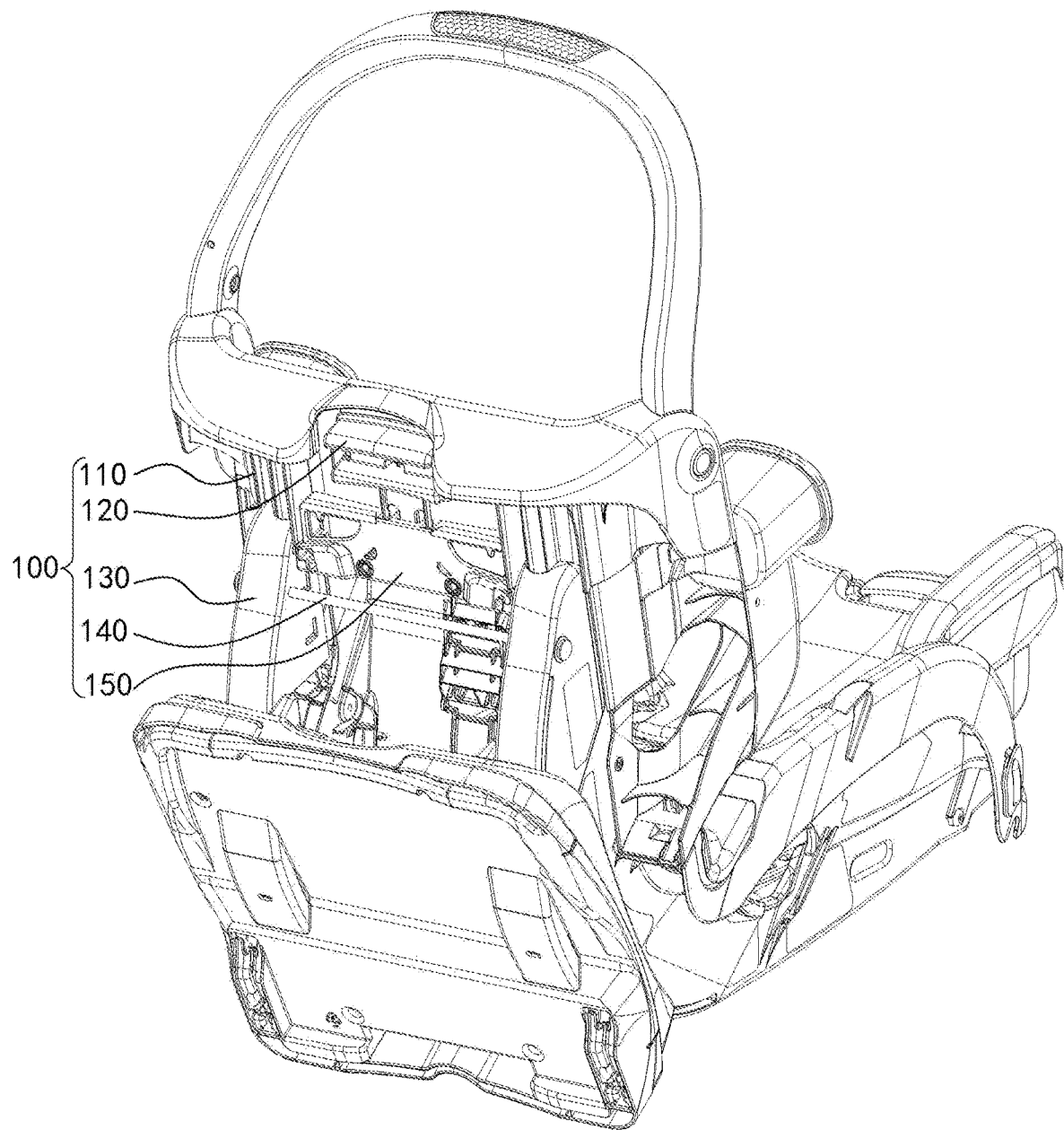
FIG. 3A is a perspective view of the child safety seat according to the disclosure from another angle, wherein and anti-skipping device is shown.
Figure 3B:
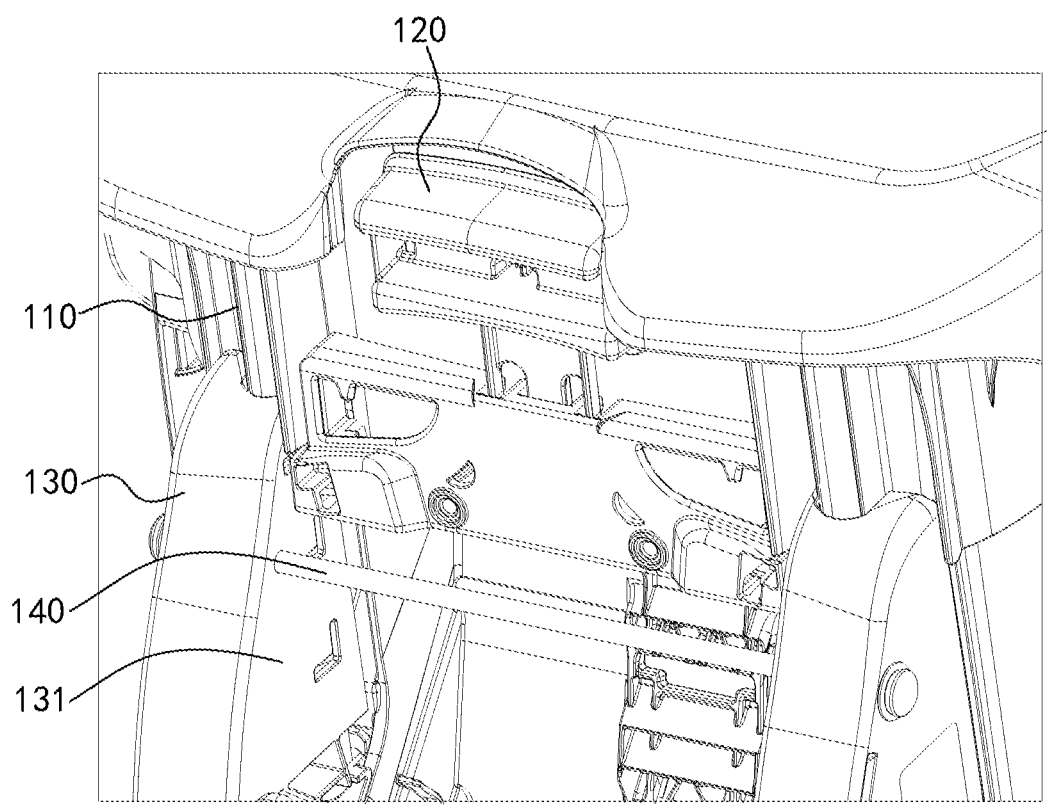
FIG. 3B is a partial enlarged view of FIG. 3A.

The anti-skipping device 100 according to the disclosure will now be described in its entirety by referring to FIGS. 3A-3B. FIG. 3A is a perspective view of the child safety seat according to the disclosure from another angle, in which the anti-skipping device 100 is shown; and FIG. 3B is a partially enlarged view of FIG. 3A.

As shown, the anti-skipping device 100 includes: an extension member 110, a locking member 120, a pair of fixed bases 130, a crossbar 140, and a casing 150. Among them, the extension member 110 is fixed to the foot pedal 300, so as to bring the foot pedal 300 to move. The fixed bases 130 are fixed to a bottom of the seat part 200. The extension member 110 is arranged to be able to move longitudinally along the fixed bases 130. The locking member 120 is attached to a middle of the bottom of the extension member 110, which locks and releases a longitudinal movement of the extension member 110 in respect to the fixed bases 130. The crossbar 140 is connected between two side walls 131 of the fixed bases 130. The casing 150 is buckled under the extension member 110, so as to form a space for accommodating the locking member 120.

Specific structures of the components of the anti-skipping device 100 will now be described.

Figure 4A:
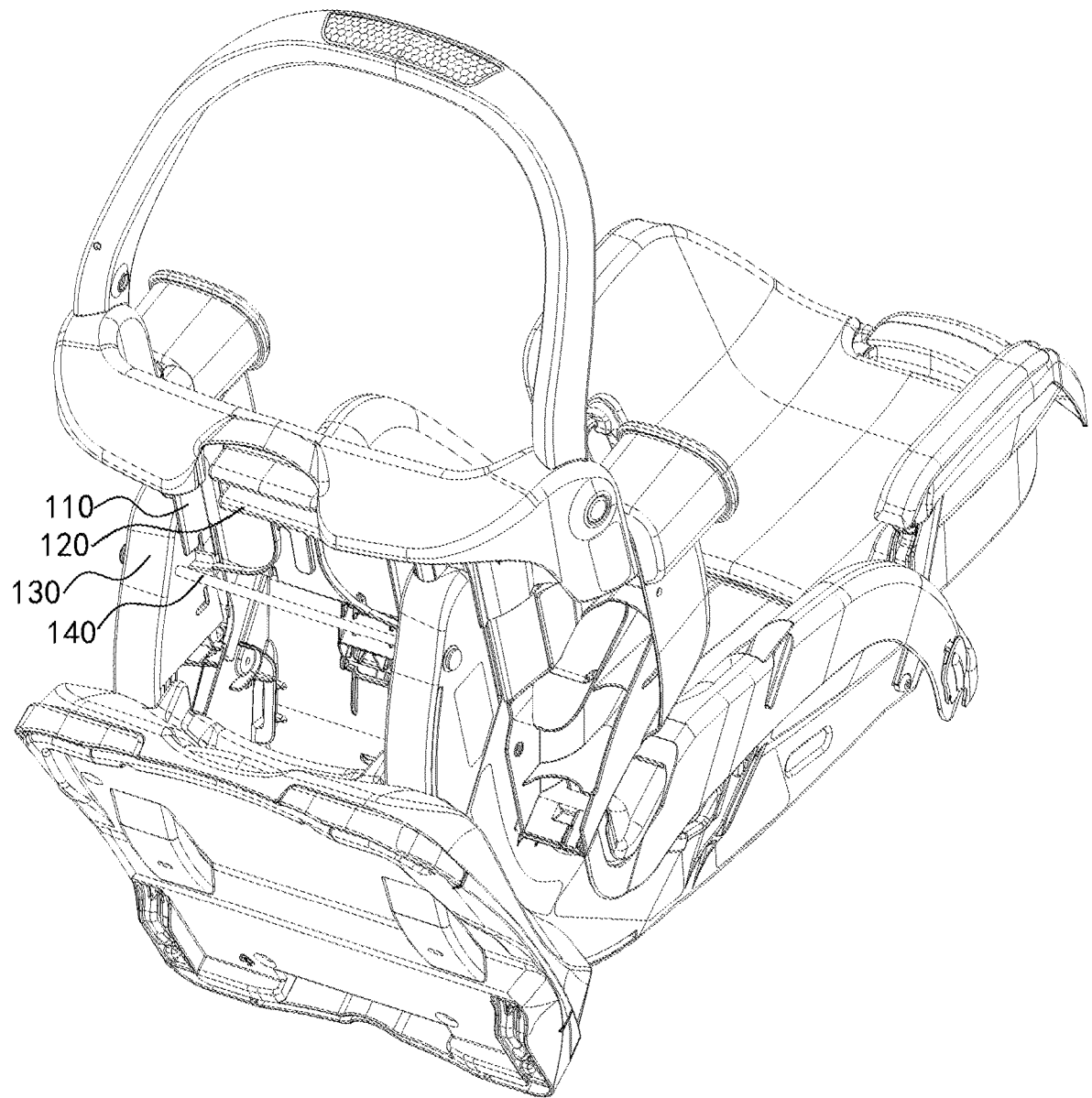
FIG. 4A illustrates the child safety seat according to the disclosure, wherein a casing of the anti-skipping device is removed to show its internal structure more clearly.
Figure 4B:
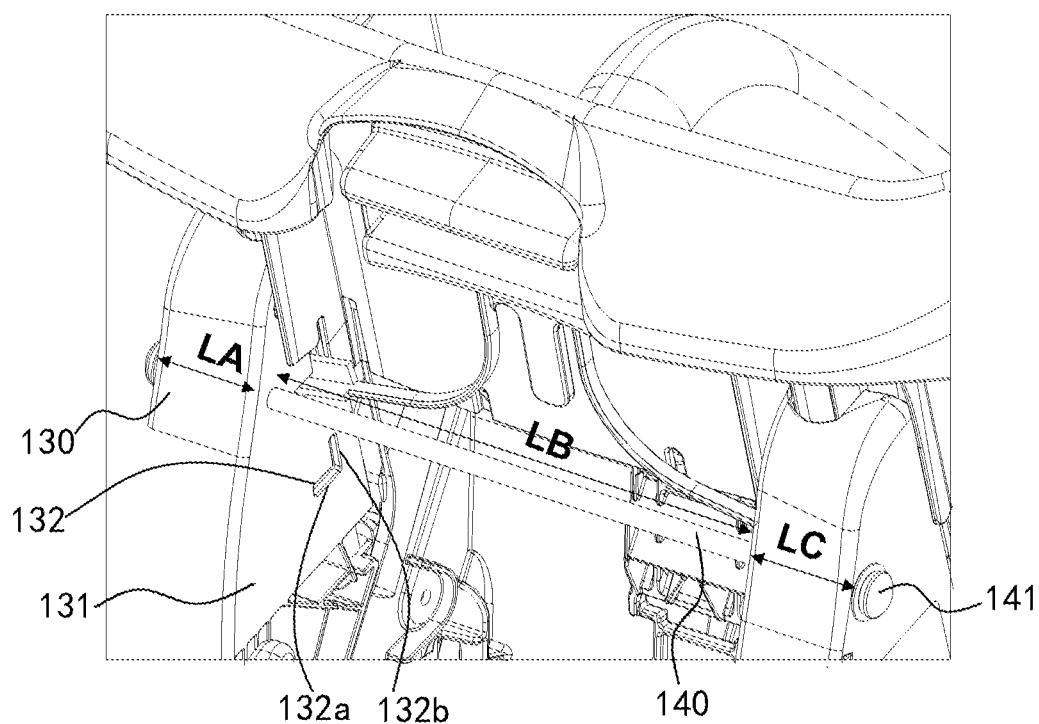
FIG. 4B is a partial enlarged view of FIG. 4A.
Figure 7:
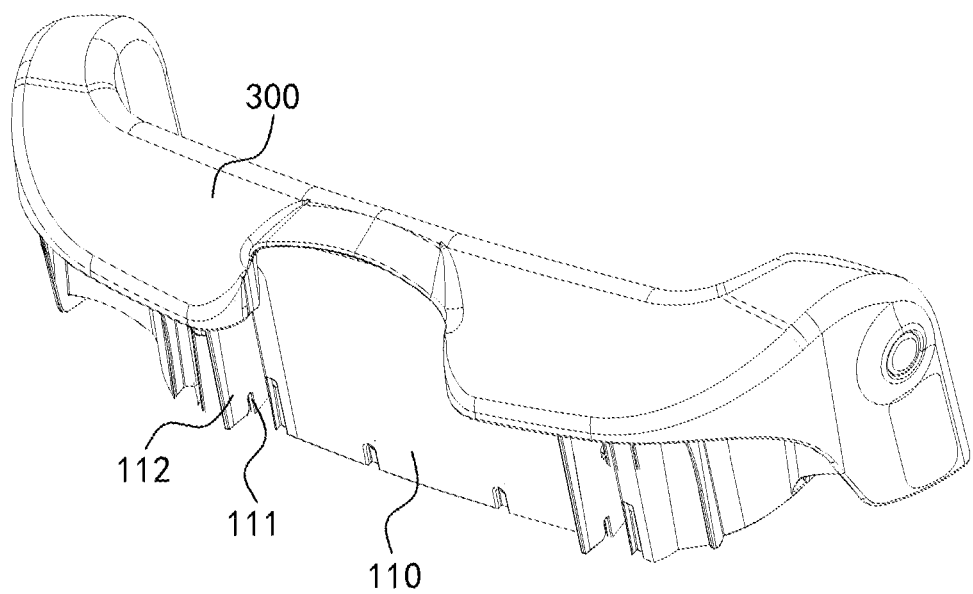
FIG. 7 illustrates an extension member of the child safety seat according to the disclosure.

Firstly, the specific structure of the extension member 110 will be described by referring to FIGS. 4A-4B, and 7. As shown, the extension member 110 is a plate-like component extending generally in a lateral direction. A front end of the extension member 110 is fixed to the foot pedal 300, so as to bring the foot pedal 300 to move together. In other embodiments, the extension member 110 and the foot pedal 300 may also be formed integrally. Left and right sides of the extension member 110 are respectively provided with a hollow cylindrical component, i.e., a slide rail accommodating portion 112, which is extending in the longitudinal direction. In use, each of the slide rail accommodating portions 112 is sleeved on a slide rail 133 of each of the fixed bases 130 (see FIG. 5A, which will be described below), such that the extension member 110 can slide longitudinally in respect to the fixed bases 130. Limiting slots 111 are respectively disposed on both sides of the extension member 110. The limiting slots 111 are formed on a vertically extending plate-like portion of the extension member 110, and are in the form of longitudinal straight slots on the rear side of the plate-like portion. In use, the casing 150 is partially clamped into the limiting slots 111 to limit and fix the casing 150 and the extension member 110, so as ensure the reliability of the limiting and fixing between the casing 150 and the extension member 110.

The specific structure of the fixed bases 130 will now be described by referring to FIGS. 4A-4B. As shown, the fixed bases 130 includes two side walls 131, and the two side walls 131 face each other in the lateral direction and have a certain lateral thickness. A transverse cross-section of each side wall 131 is substantially a right-angled triangle, wherein a long right-angled side fits a bottom side of the seat part 200, a short right-angled side extends downward from the bottom side of the seat part 200, and an oblique side faces the front and lower side of the seat part 200. The two side walls 131 of the fixed bases 130 may be formed integrally by a connecting portion (not show) located therebetween, or may be fixed to the seat part 200 independently of each other. In an embodiment, the side walls 131 are hollow to reduce overall weight.

Each of the fixed bases 130 includes a slide rail 133 extending longitudinally (see FIG. 5A), e.g., a cylindrical slide rail 133. In the illustrated embodiment, the slide rails 133 extend forward from the front of each side wall 131. In other embodiments, each of the slide rails 133 may have a different cross-sectional shape, such as a square or other polygonal cross-section. The slide rails 133 may also extend from other parts of the fixed bases 130, for example, from the outer surfaces of the side walls 131 of the fixed bases 130.

Each side wall 131 of the fixed bases 130 has an inner surface and an outer surface, in which the inner surfaces are faces of the two side walls 131 that face each other, and the outer surfaces are the faces of the two side walls 131 that face away from each other. The inner surface of each side wall 131 is provided with an insertion slot 132, such that the plug 123 (see FIG. 8) of the locking member 120 can be inserted therein, thereby locking the extension member 110 in position. A plurality of the insertion slot 132 may be formed in the longitudinal direction to provide a plurality of different locking positions for the extension member 110. Each of the insertion slots 132 includes a vertical portion 132a and a longitudinal portion 132b. The vertical portion 132a and the longitudinal portion 132b extend vertically and longitudinally, respectively, and intersect at a point to form an inverted L-shaped insertion slot 132. Among them, the vertical portion 132a extends downward from the intersection, and the longitudinal portion 132b extends forward from the intersection. In this embodiment, the vertical portion 132a and the longitudinal portion 132b have substantially the same length, but in other embodiments, the vertical portion 132a and the longitudinal portion 132b may have different lengths.

Figure 5A:
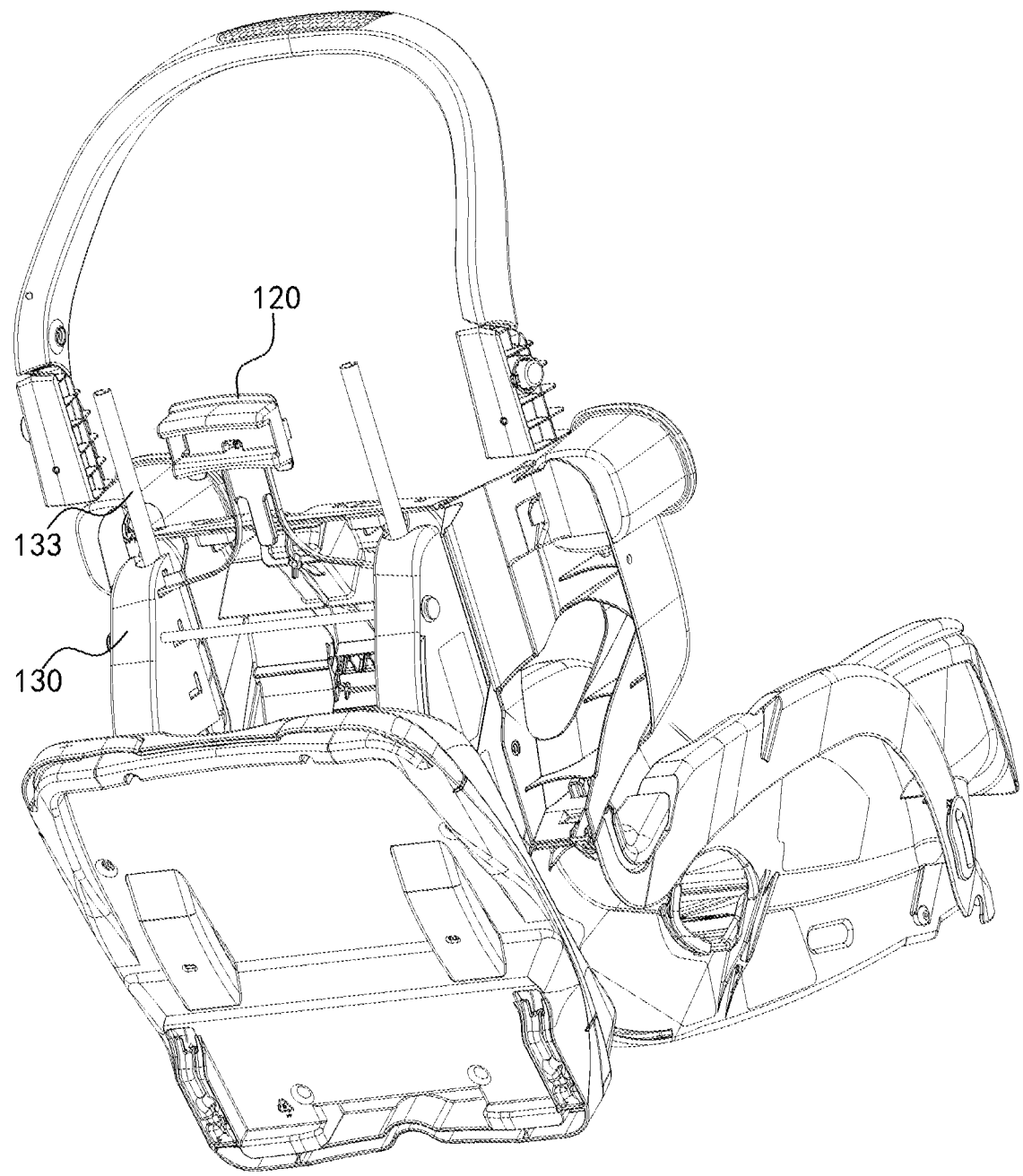
FIG. 5A illustrates child safety seat the according to the disclosure, wherein the casing and an extension member of the anti-skipping device are removed to more clearly show its internal structure.
Figure 5B:
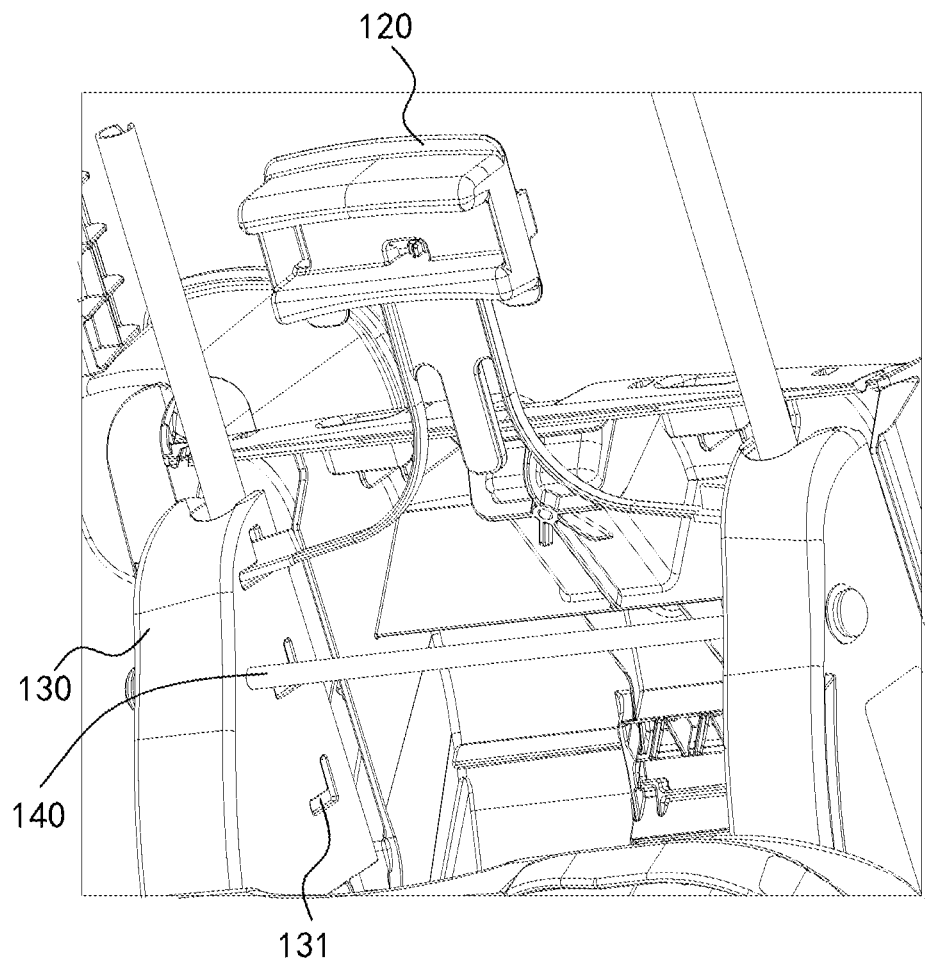
FIG. 5B is a partial enlarged view of FIG. 5A.
Figure 8:
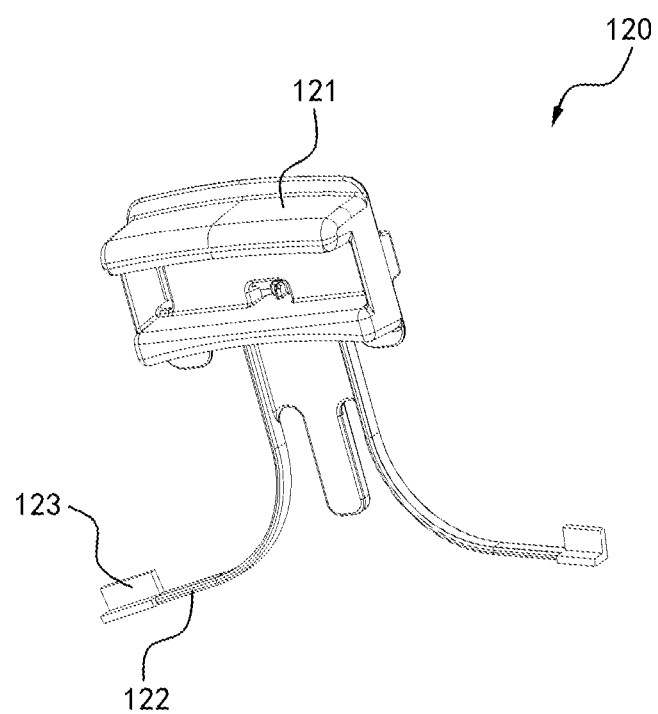
FIG. 8 illustrates a locking member of the child safety seat according to the disclosure.
Figure 9A:
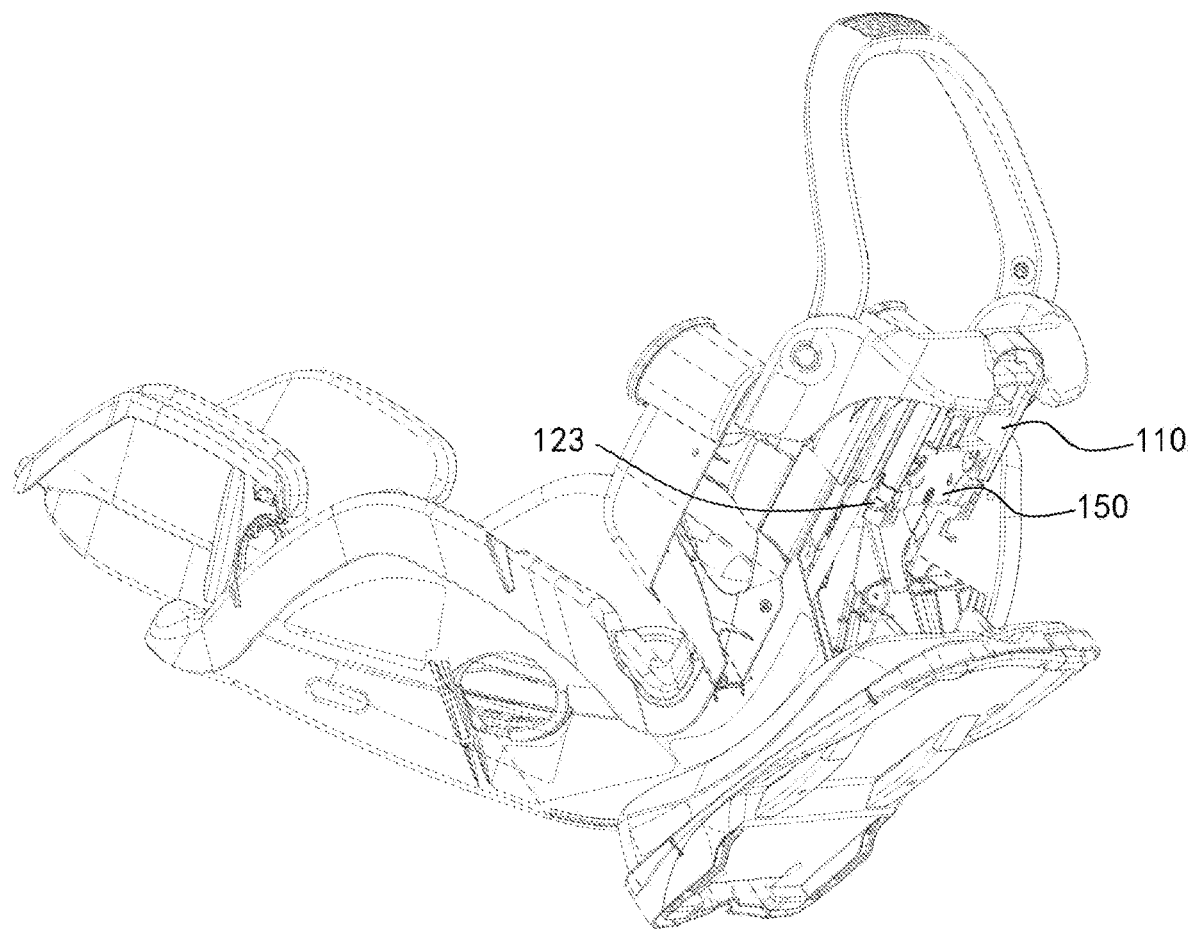
FIG. 9A illustrates a bottom perspective view of the child safety seat according to the disclosure, wherein a fixed base is removed to show a positional relationship among the extension member, the casing and a plug.
Figure 9B:
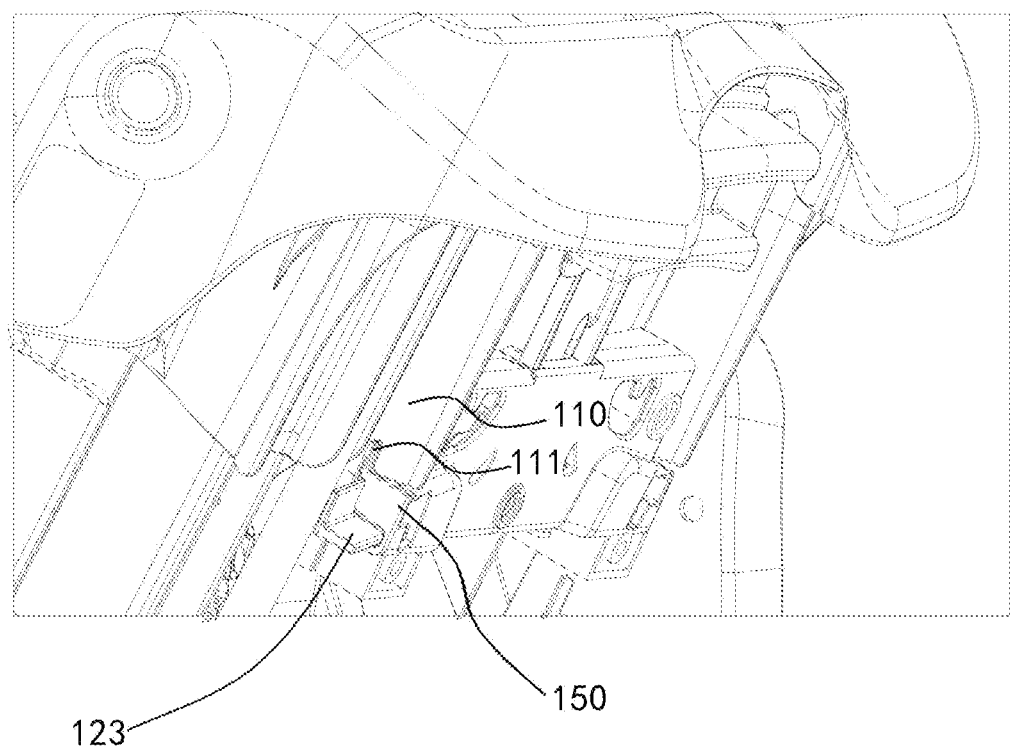
FIG. 9B is a partial enlarged view of FIG. 9A.
Figure 10A:
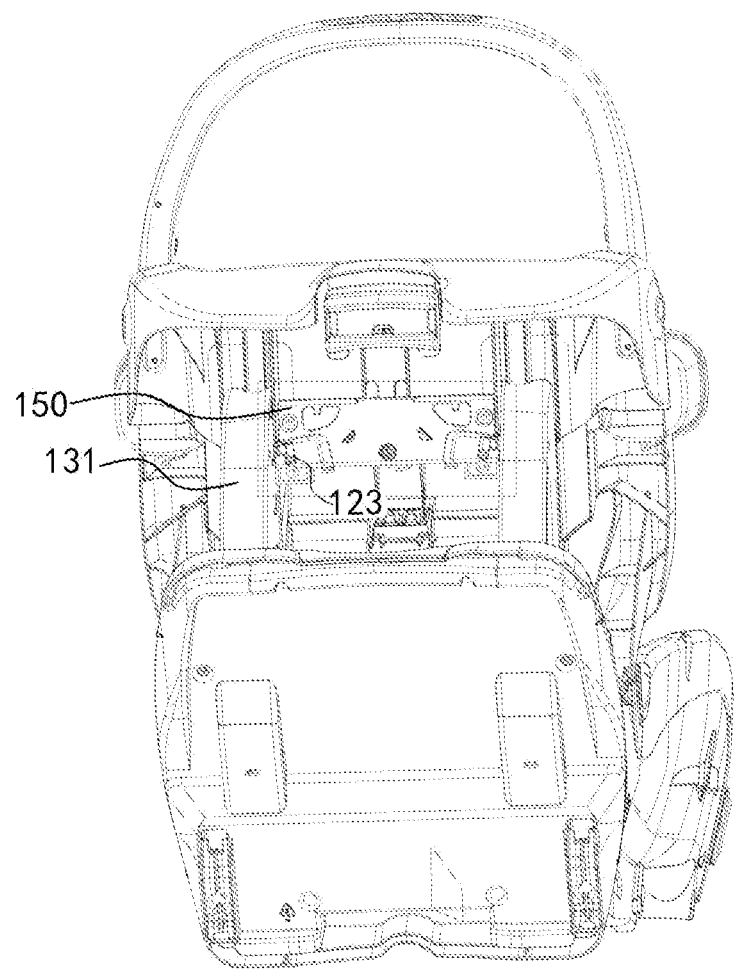
FIG. 10A illustrates a bottom perspective view of the child safety seat according to the disclosure from another angle, wherein the plug is shown inserted into a side wall through a plug passing slot in the casing.
Figure 10B:
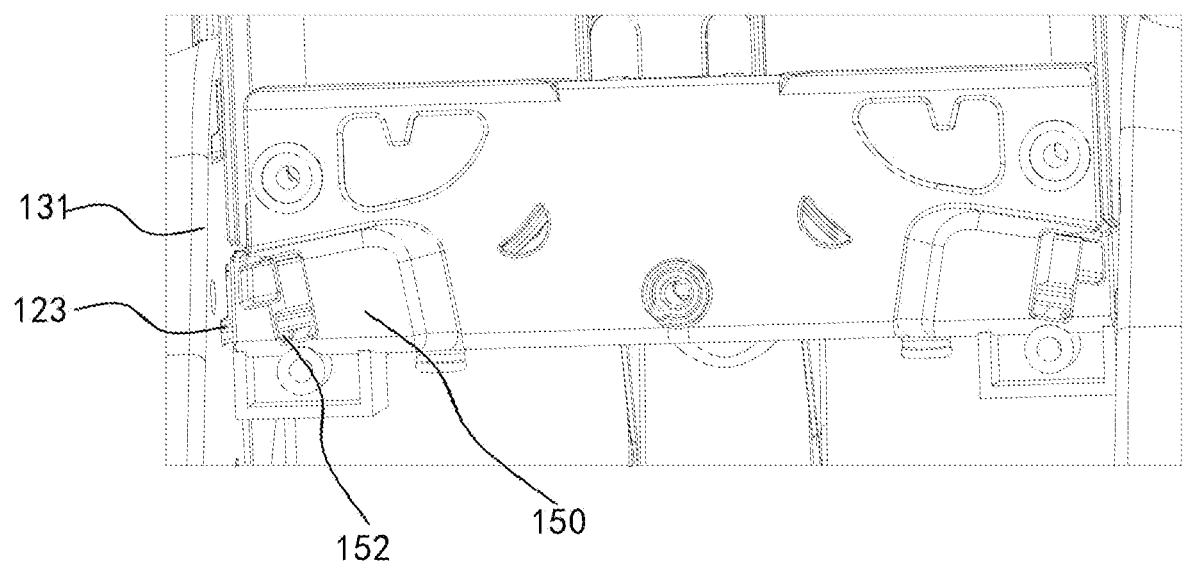
FIG. 10B is a partial enlarged view of FIG. 10A.
Figure 11:
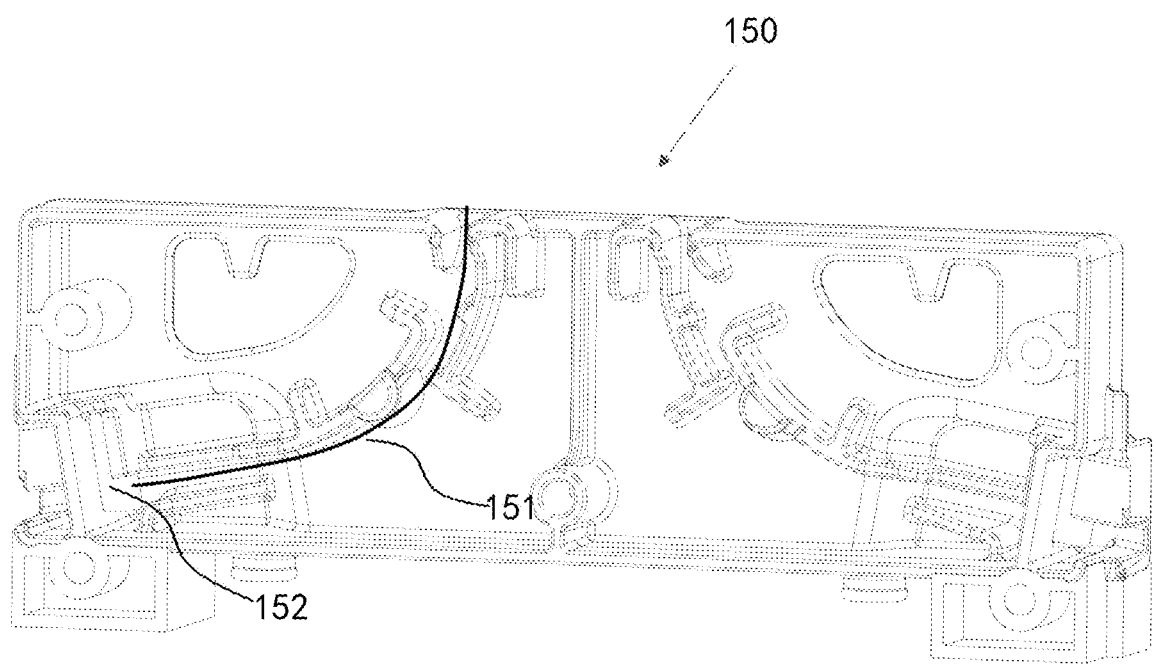
FIG. 11 illustrates a side of the casing according to the disclosure facing the extension member.

Now the specific structure of the locking member 120 will be described by referring to FIGS. 5A-5B and 8. As shown, the locking member 120 has a generally square handle 121 and two arms 122 extending from the handle 121. The two arms 122 extend from around a lateral center of a rear side of the handle 121 and extend approximately near the handle 121 in the longitudinal direction, and then the two arms gradually transit to extend laterally and extend toward left and right, respectively, so as to form an arc shape of about a quarter of the circumference of the two arms 122 which are symmetrical to each other. The locking member 120 includes plugs 123 located at an end of each arm 122 remote from the handle 121. The plugs 123 each extends substantially in the lateral direction and has a uniform lateral cross-sectional shape. The lateral cross-sectional shape of each of the plug 123 corresponds to the shape of each of the insertion slots 132 in the side walls 131 of the fixed bases 130 (i.e., an L-shape formed by a vertical portion 132a and a longitudinal portion 132b), and is slightly smaller than the insertion slot 132, so as to easily slide into the insertion slot 132. The arms 122 are made of a rigid material that can be elastically deformed to some extent, so as to allow the arms 122 to be drawn out or fed into the slideways 151 of the casing 150 (will be described below).

Now the crossbar 140 will be described by referring to FIGS. 4A-5B. As shown, the crossbar 140 is a bar-shaped component laterally inserted between the two side walls 131. Both ends of the crossbar 140 are inserted through the inner and outer surfaces of the two side walls 131, respectively, and are finally exposed outside the outer surfaces. Both ends of the crossbar 140 are each provided with a stopper 141, and the stopper 141 may be a portion of the crossbar 140 with enlarged diameter in cross section, or an annular component sleeved onto the crossbar 140. The stoppers 141 may be clamped on outer sides of the outer surfaces of the side walls 131, thereby restricting movement of the two side walls 131 away from each other.

During use of the child safety seat, if the foot pedal 300 is subjected to an impact (especially an impact downward or rearward), the foot pedal 300 may transmits the impact force to the extension member 110, and further to the locking member 120. Since the two arms 122 of the locking member 120 have laterally extending portions, the locking member 120 will be able to convert the impact force into a lateral thrust against the side walls 131, particularly from the inside towards the outside of the side walls 131. In such situation, the side walls 131 may move away from each other, i.e., respectively move to outside, such that the plugs 123 of the arms 122 are departed from the insertion slot 132 of the side wall 131. As a result, the locking member 120 releases the foot pedal 300 from locking position, causing a skipping phenomenon.

Beneficial from the crossbar 140, the two side walls 131 are restricted from moving away from each other, thus effectively preventing the skipping phenomenon. Specifically, if the extension member 110 is impacted by a certain external force, especially impacted caused by the occupant stepping down on the extension member 110, the extension member 110 may transmit the impact to the two side walls 131 of the fixed bases 130, thereby generating a laterally outward thrust to the side walls 131. However, from the outside of the side walls 131, the crossbar 140 restricts the movement of the two side walls 131 away from each other, absorbs the impact brought by the extension member 110, and prevents the extension member 110 from lock-escaping due to the side walls 131 moving away from each other. This will ensures the stability of the extension member 110 after being extended, that is, to ensure the stability of the foot pedal 300 after being extended, especially, when the occupant kicks the foot pedal 300, the extension member 110 will not be retracted due to skipping, so as to ensure normal use of the foot pedal 300, and also prevent the occupant from being injured due to retraction of the extension member 110 caused by skipping, thereby improving safety in use.

The crossbar 140 can be placed any position in a triangular area below the insertion slot 132 of each of the side walls 131, The position shown in FIG. 4B, i.e., the position at about the first third of the longitudinal length of the side wall 131 and close to the lower side hypotenuse of the side wall 131, is preferred. The diameter of the crossbar 140 can be up to about half of the length of the vertical side of the side wall 131 (about 43 mm), and a preferred diameter is about one-tenth of the length of the vertical side of the side wall 131 (about 8 mm). The length LB of the portion of the crossbar 140 located between the two side walls 131 is greater than the lengths LA and LC of the portion of the crossbar 140 inserted inside each of the side walls 131. In a preferred embodiment, LB=188 mm, LA=LC=40 mm.

Figure 6:
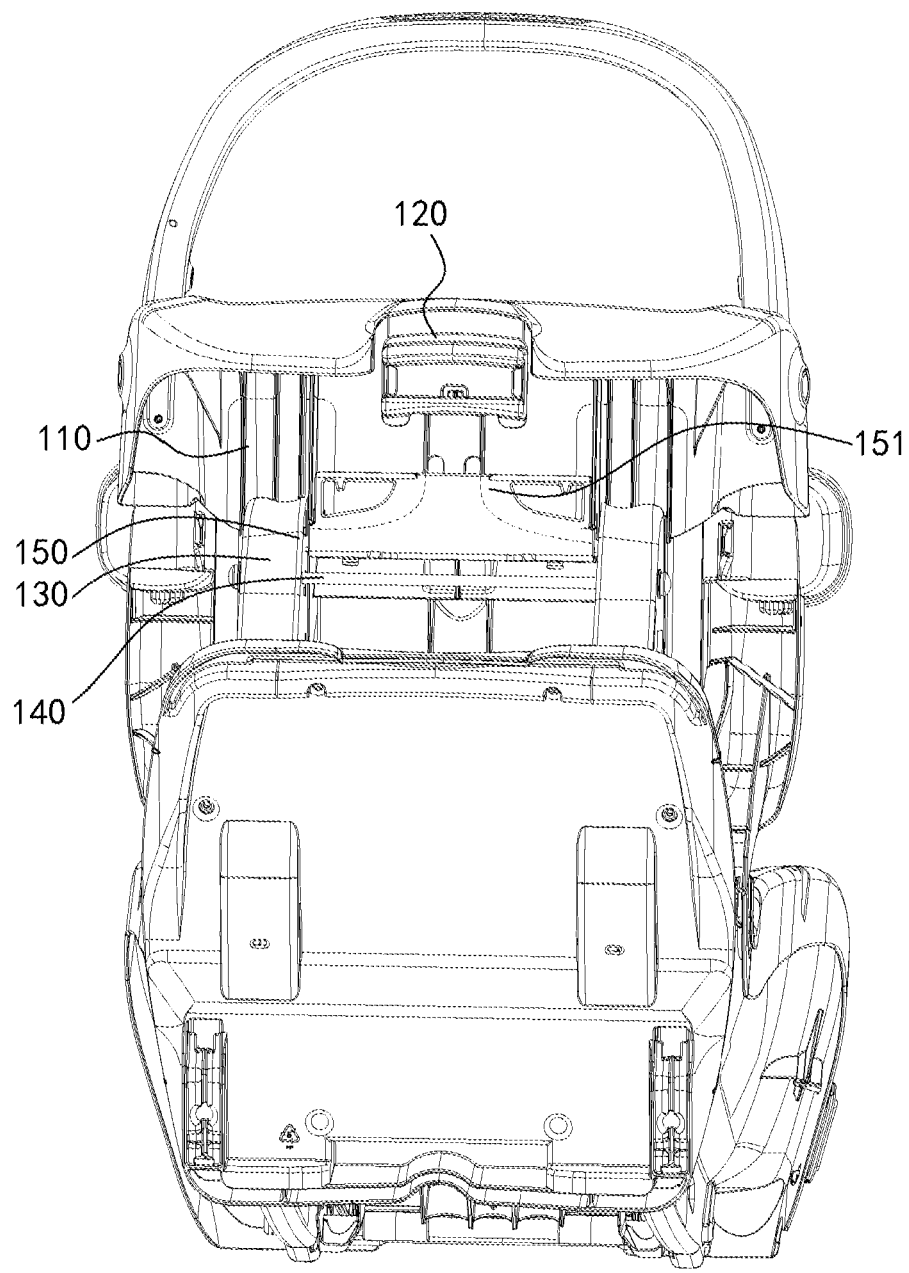
FIG. 6 illustrates the child safety seat the according to the disclosure, wherein a slideway in the casing of the anti-skipping device is shown.

Now the casing 150 will be described by referring to FIG. 6. As shown, the casing 150 is a substantially rectangular component is buckled on the bottom side of the extension member 110, and moves together with the extension member 110. The casing 150 is located between the two side walls 131 of the fixed bases 130. In an embodiment, left and right edges of the casing 150 are respectively adjacent to the inner surfaces of the two side walls 131 of the fixed bases 130. The two arms 122 of the locking member 120 are located at least partially between the casing 150 and the extension member 110.

The casing 150 is provided with two slideways 151 on its side facing the extension member 110, as shown by the dotted lines in the figure. Shapes of the two slideways 151 correspond to that of the two arms 122 of the locking member 120. That is, the slideways 151 extend from the front side edge of the casing 150 near the center, initially extends rearward in a substantially longitudinal direction, and then gradually transits to extending laterally (the two slideways 151 respectively extends leftward and rightward), such that two arc-shaped slideways 151 are formed as extending from the front edge to the two side edges of the casing 150.

The two arms 122 of the locking member 120 are respectively accommodated in the two slideways 151 of the casing 150, and their movement tracks are defined by the slideways 151. A longitudinal movement of the handle 121 will be transferred into a lateral movement of the plugs 123 at the ends of the arms 122 through the slideways 151. Specifically, when the handle 121 moves forward (i.e., reaches a release position), the plugs 123 will move laterally toward inside, thereby retracting into the casing 150; and when the handle 121 moves backward (i.e., reaches the locked position), the plugs 123 will move laterally toward outer side, so as to protrude from the casing 150.

In an embodiment, the arms 122 of the locking member 120 are components having a shape memory and tend to protrude from the casing 150. When the locking member 120 is moved to the release position, the arms 122 will move into the casing 150, thus generating a restoring force towards the locked position. In this way, due to the resiliency of the arms 122, the locking member 120 is preloaded to tend to move towards the locked position.

In another embodiment, an additional elastic member, such as a spring, is disposed between the locking member 120 and the extension member 110. The elastic member biases the locking member 120 to the locked position.

In FIGS. 9A-11, the structure of the casing 150 and its positional relationship with the extension member 110 and the fixed bases 120 are shown.

Both lateral sides of the casing 150 are respectively provided with plug passing slots 152. Shapes of the plug passing slots 152 are substantially the same as the cross-sectional shape of the plugs 123, i.e., L-shaped. The plugs 123 can be extended from the casing 150 or retracted into the casing 150 through the plug passing slots 152. Therefore, when the plugs 123 protrude from the casing 150, they are located in both the plug passing slots 152 and the insertion slots 132. In this way, the plugs 123 lock the relative positions of the plug passing slots 152 and the insertion slots 132, and thus lock the relative positions of the casing 150 and the fixed bases 130. Moreover, because the casing 150 is fixed to the extension member 110, the plugs 123 also lock the relative positions of the extension member 110 and the fixed bases 130.

Now the operation of the anti-skipping device 100 according to the disclosure will be described.

When the user wants to unlock the foot pedal 300, he/she needs to put a hand under the seat part 200, and pull the handle 121 of the locking member 120 by abutting against the foot pedal 300. In this way, the locking member 120 will overcome the biasing force that preloads it to the locked position, hereby moving to the release position. At the same time, the arms 122 of the locking member 120 will retract into the casing 150, and the plugs 123 of the locking member 120 will depart the insertion slots 132 in the side walls 131 of the fixed bases 130. In this way, the extension member 110 (and the foot pedal 300) will be departed from the locking relationship with the fixed bases 130 (and the seat part 200), so as to allow the user to move the foot pedal 300 to an appropriate position, including the extended position and the retracted position.

When the user wants to lock the foot pedal 300, it is needed to release the handle 121 of the locking member 120, and move the foot pedal 300 to an appropriate position including the extended and retracted positions, such that the plugs 123 on the locking member 120 can be aligned with the insertion slots 132 on the fixed bases 130. In this way, since the locking member 120 is preloaded to move to the locked position, the plugs 123 will protrude from the plug passing slots 152 of the casing 150 to be inserted into the insertion slots 132. At the same time, since the plugs 123 on the arms 122 are also located in the plug passing slots 152, the plugs 123 lock the positional relationship between the casing 150 and the fixed bases 130, thereby forming a locking relationship between the extension member 110 (and the foot pedal 300) and the fixed bases 130 (and the seat part 200).

Although the disclosure has been described with reference to several typical embodiments, the terms used are terms of description and illustration rather than limitation. Since the disclosure can be embodied in various forms without departing from its spirit and essence, it should be understood, the above embodiments are not limited to any details described above, but should be interpreted in the broadest sense within the scope defined by the claims, and therefore all changes that fall within the scope of the claims or their equivalents should be covered by the claims.

What is claimed is:

1. An anti-skipping device, comprising:
   a pair of fixed bases symmetrically disposed on both sides, the pair of the fixed bases having slide rails extending along a longitudinal direction and having two side walls facing each other along a transverse direction perpendicular to the longitudinal direction;
   an extension member movably inserted on the fixed bases and being slidable along the slide rails to move between an extended position and a retracted position in respect to the fixed bases;

a locking member configured to engage with the fixed bases and the extension member, so as to lock a position of the extension member in respect to the fixed bases; and a crossbar disposed between the two side walls to prevent the two side walls from being laterally displaced from each other.

2. The anti-skipping device according to claim 1, wherein: both ends of the crossbar are respectively inserted into outer sides of the two side walls, and are fastened to the two side walls by fixed stoppers on the outer sides to prevent a lateral displacement of the two side walls away from each other.

3. The anti-skipping device according to claim 2, wherein: the crossbar is arranged at a position where one side of the extension member does not interfere with a movement of the extension member.

4. The anti-skipping device according to claim 3, further comprising:

a casing fixed to the extension member and located between the crossbar and the extension member;

at least two sets of insertion slots provided respectively on opposite surfaces of the two side walls of the fixed bases; and plug passing slots provided respectively at both sides of the casing and matched with the insertion slots;

wherein if the insertion slots are aligned with the plug passing slots, the locking member is inserted into both the insertion slots and the plug passing slots, such that a position of the extension member is fixed in respect to the fixed bases.

5. The anti-skipping device according to claim 4, wherein: the locking member is located on a side of the extension member facing the crossbar, and has a handle and two symmetrically arranged arms, the two arms respectively extend from the handle toward the two side walls of the fixed bases, and ends of the two arms are respectively provided with plugs, and if the insertion slots are aligned with the plug passing slots, the plugs are inserted into both the insertion slots and the plug passing slots.

6. The anti-skipping device according to claim 5, wherein: the handle is located at a lateral middle position of the extension member, and the two arms are arc-shaped components which are bent to extend in approximately a quarter-circle arc respectively from the lateral middle position of the handle toward the two side walls.

7. The anti-skipping device according to claim 6, wherein: the arms are rigid arms;

each of the insertion slots includes a longitudinal portion and a vertical portion, the longitudinal portion and the vertical portion are substantially linear and intersect each other on an intersection point; and each of the plugs has a shape corresponding to the insertion slots so as to be inserted into the insertion slots and forming shape fit with the insertion slots.

8. The anti-skipping device according to claim 7, wherein: one set of the at least two sets of insertion slots corresponds to the extended position of the extension member, and another set of the at least two sets of insertion slots correspond to the retracted position of the extension member.

9. The anti-skipping device according to claim 8, wherein two slideways are formed in the casing, and the two slideways extend toward the two side walls, respectively, with approximately a quarter-circle arc, for accommodating the two arms, thereby defining motion trajectories of the two arms.

10. The anti-skipping device according to claim 9, wherein:

in the extended or retracted position of the extension member, the arms of the locking member protrude from the slideways and are inserted into the insertion slots and the plug passing slots; and under pulling of an external force, the arms of the locking member are retracted into the slideways to disengage from the insertion slots and the plug passing slots, such that the extension member slides in respect to the fixed bases along the longitudinal direction.

11. The anti-skipping device according to claim 10, wherein:

an elastic member is disposed between the locking member and the casing, and the elastic member applies a restoring force to the locking member, such that the two arms of the locking member remain in a state of protruding from the slideways.

12. The anti-skipping device according to claim 1, wherein:

the crossbar is disposed at approximately a first third of a longitudinal length of the side walls;

a diameter of the crossbar is approximately one tenth of a length of vertical edges of the side walls; and a length of one portion of the crossbar between the two side walls is greater than a length of another portion of the crossbar inserted inside each of the side walls.

13. A seat footrest device, comprising:

a foot pedal; and the anti-skipping device according to claim 1;

wherein the foot pedal is wrapped on the extension member of the anti-skipping device.

14. The seat footrest device according to claim 13, wherein:

both ends of the crossbar are respectively inserted into outer sides of the two side walls, and are fastened to the two side walls by fixed stoppers on the outer sides to prevent a lateral displacement of the two side walls away from each other.

15. The seat footrest device according to claim 14, wherein:

the crossbar is arranged at a position where one side of the extension member does not interfere with a movement of the extension member.

16. The seat footrest device according to claim 15, further comprising:

a casing fixed to the extension member and located between the crossbar and the extension member;

at least two sets of insertion slots provided respectively on opposite surfaces of the two side walls of the fixed bases; and plug passing slots provided respectively at both sides of the casing and matched with the insertion slots;

wherein if the insertion slots are aligned with the plug passing slots, the locking member is inserted into both the insertion slots and the plug passing slots, such that a position of the extension member is fixed in respect to the fixed bases.

17. The seat footrest device according to claim 16, wherein:

the locking member is located on a side of the extension member facing the crossbar, and has a handle and two symmetrically arranged arms, the two arms respectively extend from the handle toward the two side walls of the fixed bases, and ends of the two arms are respectively provided with plugs; and if the insertion slots are aligned with the plug passing slots, the plugs are inserted into both the insertion slots and the plug passing slots.

18. The seat footrest device according to claim 17, wherein:

the handle is located at a lateral middle position of the extension member, and the two arms are arc-shaped components which are bent to extend in approximately a quarter-circle arc respectively from the lateral middle position of the handle toward the two side walls.

19. The seat footrest device according to claim 13, wherein:

the handle of the locking member of the anti-skipping device is exposed on a side of the foot pedal facing the crossbar.

20. A child safety seat, comprising:

a seat part; and the seat footrest device according to claim 13;

wherein the foot pedal of the seat footrest device and the anti-skipping device are located below the seat part;

the fixed bases of the anti-skipping device are fixed to a bottom side of the seat part, the longitudinal direction is a front-rear direction of the seat part, and the transverse direction is a left-right direction of the seat part;

if the extension member is in the extended position, the foot pedal protrudes from a bottom side of the seat part to a front of the seat part; if the extension member is in the retracted position, the foot pedal is at least partially located below the bottom side of the seat part; and the handle of the locking member of the anti-skipping device is exposed below the foot pedal.

* * * * *